United States Patent [19]

Davies

[11] 4,383,069
[45] May 10, 1983

[54] POLYARYLENE SULPHIDE COMPOSITIONS

[75] Inventor: Glyndwr J. Davies, Southall, England

[73] Assignee: The Glacier Metal Company Limited, Wembley, England

[21] Appl. No.: 355,747

[22] PCT Filed: Jul. 2, 1981

[86] PCT No.: PCT/GB81/00128
§ 371 Date: Mar. 3, 1982
§ 102(e) Date: Mar. 3, 1982

[87] PCT Pub. No.: WO82/00154
PCT Pub. Date: Jan. 21, 1982

[30] Foreign Application Priority Data

Jul. 4, 1980 [GB] United Kingdom ............ 8022065

[51] Int. Cl.³ .................................. C08K 5/12
[52] U.S. Cl. ........................................ 524/299
[58] Field of Search ........................ 524/293, 299

[56] References Cited

U.S. PATENT DOCUMENTS

| | | | |
|---|---|---|---|
| 3,354,129 | 11/1967 | Edmonds, Jr. | 526/280 |
| 3,699,087 | 10/1972 | Wood et al. | 525/474 |
| 3,725,362 | 4/1973 | Walker | 525/474 |
| 4,038,262 | 7/1977 | Edmonds, Jr. | 524/299 |

FOREIGN PATENT DOCUMENTS

| | | | |
|---|---|---|---|
| 53-127551 | 11/1978 | Japan | 524/292 |
| 55-82130 | 6/1980 | Japan | 524/500 |
| 57-44136 | 1/1982 | Japan | 524/540 |
| 1513378 | 6/1978 | United Kingdom . | |

*Primary Examiner*—Joseph L. Schofer
*Assistant Examiner*—N. Serofim
*Attorney, Agent, or Firm*—Oblon, Fisher, Spivak, McClelland & Maier

[57] ABSTRACT

A composition comprising an intimate mixture of a polyarylene sulphide with an aryl ester of an aryl alcohol, the ester being in solid solution in the resin. The preferred mixture comprises polyphenylene sulphide and benzyl benzoate. There is also described a method of curing polyarylene sulphide in which the solid solution of the ester in the resin is formed and this is heated so that the ester evaporates and the resin cures simultaneously.

6 Claims, No Drawings

POLYARYLENE SULPHIDE COMPOSITIONS

The present invention relates to polyarylene sulphide compositions.

Polyarylene sulphides have properties which make them suitable for use in various situations, for example as plain bearing linings. However, they also possess properties which make their preparation and application inconvenient and frequently difficult.

Available techniques involve the use of toxic chemicals or techniques involving what is essentially powder fusion. The powder fusion techniques limit the roles in which polyarylene sulphides can be used and involve slow processes of low productivity.

One of the properties of polyarylene sulphides which limits their use is their high viscosities in the molten state. This renders the distribution of the material difficult in the extreme and makes it difficult therefore to establish a bond between the polyarylene sulphide and another material. One known method of forming a bond between the polyarylene sulphide and another material is to apply the polyarylene sulphide powder to the other material as level and evenly as possible, and then to melt, cure and cross-link the powder. Water based dispersions of PPS are also known but this is just another form of applying powder since this is what remains after the water has been evaporated.

However, as stated above, using polyarylene sulphide powder involves considerable manufacturing difficulties. Polyphenylene sulphide takes a long time to cure and crosslink particularly when the powder layer is relatively thick. Also since the molten powder has a high viscosity and generally does not flow or wet a surface very well, this results in voids and consequently a poor bond between the polyphenylene sulphide and the other material which bond may fail when under load.

It is also difficult to achieve a precision thickness of polyarylene sulphide which is dimensionally stable and even more difficult to produce very thin, cured layer.

It is an object of the present invention to provide polyarylene sulphide in a workable form in order to minimise the above difficulties in its use.

The present invention is based on the discovery that benzyl benzoate has a plasticizing action on polyphenylene sulphide.

According to the present invention a composition of matter is characterised in that it comprises polyarylene sulphide with an aryl ester of an aryl alcohol, the ester being in solution in the resin.

The resin phase may further include other resins besides polyarylene sulphide in either a major or minor proportion based on the polyarylene sulphide. Such other resins may include polytetrafluoroethylene, polyimides and polysulphones. The resin phase may also include fillers, pigments, dyes, surface active additives, stabilizers, cross-linking agents, coating aids such as silica or titanium oxide powders, and bases to enhance bonding.

The ester of "solvent" phase may include or comprise mixtures of aryl esters of aryl alcohols, for example one or more of benzyl benzoate, benzyl phthalate, benzyl isophthalate, and benzyl terephthalate, and other materials acting as diluents or extenders or viscosity reducers for the active solvent and having no non-solvent action such as to prevent the blend having the necessary plasticiser or solvent action for the resin phase as the case may be.

The solvent phase may also include co-solvents which whilst having no significant solvent action on their own enhance the solvent action of the benzyl benzoate.

The solvent phase may also include other solvents for polyphenylene sulphide and when the resin phase includes other resins, solvents for such other resins even if these are not solvents for polyphenylene sulphide though in this case they are preferably miscible with benzyl benzoate to form a single solvent phase.

The compositions of the invention may include solid particulate materials containing polyphenylene sulphide plasticized by benzyl benzoate or solid workable bodies of polyphenylene sulphide plasticized by benzyl benzoate. The compositions may take the form of sheets, films, tapes or fibres and may be stored and used as required.

The polyarylene sulphide resin that can be used in the present invention may be a polymer made by the method disclosed in U.S. Pat. No. 3,354,129 but in general can be represented as a polymer including a recurring unit of the formula

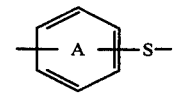

in which the ring A may be substituted.

One such form of substitution may be represented by the formula

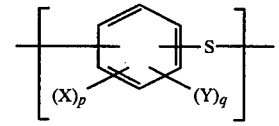

in which:

X represents a fluorine, chlorine, bromine or iodine atom, preferably chlorine or bromine, and Y represents a hydrogen atom, —R, —N(R)$_2$,

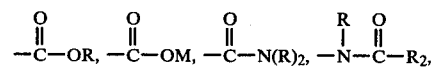

—O—R', —S—R', —SO$_3$H or —SO$_3$M groups in which:

R represents a hydrogen atom, an alkyl, cyloalkyl, aryl, aralkyl, or alkaryl group containing 1 to 12 carbon atoms and in which:

M represents an alkali metal atom of a sodium or potassium atom and in which:

p is 0 to 4 and q is 2 to 4.

Polyphenylene sulphide in which the repeat unit can be represented by the formula

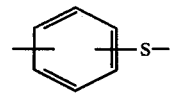

is preferred.

The polyarylene sulphides may be partially oxidized or may have a branched or cross linked structure though non-cross linked polymers or ones having a low degree of cross linking and thus relatively low M.W. are preferred e.g. those having M.W.'s in the range 17,500 to 5000. More generally polyarylene sulphides having melting points in the range 280° C. to 300° C. are preferred. Also materials having intrinsic viscosities in chloronapthalene at 260° C. of at least 0.1, e.g. 0.1 to 0.3 especially 0.13 to 0.23 are preferred.

Polyphenylene sulphide has a solubility parameter of 8.5 to 9.5. Uncured PPS sold under the Trade Mark Ryton V1 has a melt flow index of 1000 g/min. by the American Society Test Method (ASTM, D1238). Using the same test, part cured PPS sold under the Trade Marks Ryton P2 and P3 have melt flow indices of 300 and 125 g/min. respectively. In those compositions including PPS in particulate form the particle size may be in the range 10–200 microns and use of powder of such particle size is convenient as a starting point for the preparation of single phase systems in accordance with the invention.

The preferred solvent compounds for use in the present invention may be represented by the formula

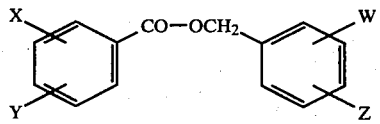

where X, Y, W and Z represent a hydrogen atom or a halogen atom e.g. a chlorine atom.

The most preferred compound is Compound I, when X, Y, W and Z are all hydrogen. A less preferred compound is Compound I when W or Z is chlorie and X, Y and Z or W are hydrogen, namely benzyl monochlorobenzoate.

Benzyl benzoate has the following properties:
melting point 18°-20° C.
boiling point 320° C.
solubility parameter 9.3

Other solvent compounds which may be used in the present invention may comprise phenyl benzoate, di-phenyl phthalate, di-benzyl ether, benzoic anhydride and di-phenyl sulphone.

According to another aspect of the invention a method of curing a polyarylene sulphide is characterised by mixing polyarylene sulphide with an aryl ester of an aryl alcohol, whereby the polyarylene sulphide is plasticised, subsequently evaporating the ester and at least partly curing the polyarylene sulphide simultaneously to leave the polyarylene sulphide in an at least partly cured state. The mixture preferably forms a single continuous phase.

Preferably the polyarylene sulphide is polyphenylene sulphide and preferably the ester is benzyl benzoate.

The plasticised mixture may be heated until one continuous liquid phase is formed. The liquid may be cooled at this stage for example in order to promote precipitation of the resin in the form of fine crystals in the ester.

This step is not absolutely necessary in all cases but may be advantageous for example if it is desired to store the formulation for any length of time.

Preferably the nature of the ester and the resin are such that when the mixture is heated the resin and ester form a single phase and as the ester evaporates, the resin undergoes curing. Preferably the ester does not evaporate completely until the resin is almost completely cured. Preferably a minimum of ester is employed since this may be lost in evaporation.

The method according to the invention may therefore render it possible to produce a cured polyarylene sulphide in the form of a thin film having a thickness hitherto thought to be unobtainable for example as low as $3 \times 10^{-6}$m or less.

The invention also extends to the use of the ester as an adhesive for the resin. A hot melt adhesive may be formed which comprises a sheet of plasticised resin. This may be used to join adjacent surfaces of for example aluminium or an aluminium alloy.

The invention may be carried into practice in various ways and will be illustrated in the following specific examples. All percentages in the following examples are by weight.

EXAMPLE 1

Dry Spinning of Fibres

Polyphenylene sulphide fibres were dry spun by pumping a 40% solution of uncured polyphenylene sulphide in benzylbenzoate heated to 260° C. through a spinneret consisting of a 3" diameter (7.62 cm) steel disc containing 60 countersunk holes of 250 micron dia. Fibre drawing rate, solvent evaporation, curing and cooling rate at the exit to the spinneret were optimised to produce strong, tough fibres which were then wound together to form a yarn.

EXAMPLE 2

Wet Spinning of Fibres

Polyphenylene sulphide fibres were wet spun by pumping a 40% solution of uncured polyphenylene sulphide in benzylbenzoate heated to 260° C. into a bath containing dyphenyl ether. Fibre drawing, heat treating and drawing conditions were controlled to produce tough, strong fibres which were then wound together to form a yarn.

EXAMPLE 3

Solvent Casting of a Film

A thin (25 microns) film of polyphenylene sulphide was cast by allowing a 10% solution of uncured polyphenylene sulphide in benzylbenzoate at 260° C. to flow onto a smooth continuous stainless steel belt treated with release agent. After carefully controlled heat treatment the polyphenylene sulphide was stripped from the casting surface as strong, tough even continuous film.

EXAMPLE 4

Film Extrusion

Cured lightly cross linked polyphenylene sulphide with 30% diphenyl sulphone plasticiser was extruded using a screw extender and calended to give a 125 micron thick strong, tough, even film.

EXAMPLE 5

Adhesives

A solid hot melt adhesive formulation was made by rapidly cooling a gel formed from cured lightly cross linked polyphenylene sulphide blended at 260° C. with 40% diphenyl sulphone. The adhesive was cast in the form of a 500 micron sheet on a glass fibre support. Flat shear test specimens were formed by sandwiching the adhesive sheet between abraded aluminium test specimens and melting and curing the adhesive under a pressure of 500 psi ($3.45 \times 10^6$ N/M²) at a temperature of 300° C. for 30 minutes.

Room temperature tensile shear tests gave a strength of 25 MN/m², the same test repeated after 24 hours in boiling water produced a result of 19.9 MN/m², demonstrating the extreme resistance of the adhesive system to water, comparing very favourably with known structural adhesives for aluminium.

I claim:

1. A composition of matter is characterised in that it comprises polyarylene sulphide mixed with an aryl ester of an aryl alcohol, the ester being in solution in the resin.

2. A composition as claimed in claim 1 characterised in that the polyarylene sulphide is polyphenylene sulphide.

3. A composition as claimed in claim 1 or claim 2 characterised in that the ester is benzyl benzoate.

4. A method of curing a polyarylene sulphide characterised by mixing polyarylene sulphide with an aryl ester of an aryl alcohol, whereby the polyarylene sulphide is plasticized, subsequently evaporating the ester and at least partly curing the polyarylene sulphide simultaneously to leave the polyarylene sulphide in an at least partly cured state.

5. A method as claimed in claim 4 characterised by heating the mixture until a single continuous liquid phase is formed and subsequently cooling the mixture to promote precipitation of the resin in the form of fine crystals.

6. A method of curing polyarylene sulphide substantially as herein specifically described in any one of Examples 1 to 5.

* * * * *